(12) United States Patent
Hashi et al.

(10) Patent No.: US 9,077,841 B2
(45) Date of Patent: Jul. 7, 2015

(54) VIDEO PROCESSING APPARATUS AND VIDEO PROCESSING METHOD

(75) Inventors: Mayuki Hashi, Kanagawa (JP); Koji Kamiya, Kanagawa (JP); Kiyoshi Yamauchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 177 days.

(21) Appl. No.: 13/434,986

(22) Filed: Mar. 30, 2012

(65) Prior Publication Data

US 2012/0257106 A1 Oct. 11, 2012

(30) Foreign Application Priority Data

| Apr. 8, 2011 | (JP) | 2011-085852 |
| Jun. 21, 2011 | (JP) | 2011-137187 |
| Oct. 12, 2011 | (JP) | 2011-224538 |

(51) Int. Cl.
*H04N 7/01* (2006.01)
*H04N 21/236* (2011.01)

(52) U.S. Cl.
CPC .......... *H04N 7/012* (2013.01); *H04N 21/23602* (2013.01)

(58) Field of Classification Search
USPC ........................................................ 348/448
See application file for complete search history.

(56) References Cited

U.S. PATENT DOCUMENTS

2001/0028409 A1* 10/2001 Watanabe et al. ............. 348/554
2007/0053664 A1* 3/2007 Sugeno et al. ................ 386/107

FOREIGN PATENT DOCUMENTS

JP 2007-104623 4/2007

* cited by examiner

*Primary Examiner* — Jefferey Harold
*Assistant Examiner* — Michael Teitelbaum
(74) *Attorney, Agent, or Firm* — Hazuki International, LLC

(57) ABSTRACT

There is provided a video processing apparatus including a video addition unit for receiving two systems of input interlaced video signals each including two fields, and adding the video signals to generate a ½× video signal of the input interlaced video signal. The video addition unit adds a second field of the interlaced video signal of one system among the two systems and a first field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems.

8 Claims, 15 Drawing Sheets

FIG.7

FIRST FIELD

| 41 + 42 |
| 43 + 44 |
| 45 + 46 |

⋮

| 1117 + 1118 |
| 1119 + 1120 |

SECOND FIELD

| 42 + 43 |
| 44 + 45 |
| 46 + 47 |

⋮

| 1118 + 1119 |
| 1120 + 1121 |

FIG.15

FIRST FIELD

| 42 + 43 |
|---|
| 44 + 45 |
| 46 + 47 |

⋮

| 1118 + 1119 |
|---|
| 1120 + 1121 |

SECOND FIELD

| 43 + 44 |
|---|
| 45 + 46 |
| 47 + 48 |

⋮

| 1119 + 1120 |
|---|
| 1121 + 1122 |

VIDEO PROCESSING APPARATUS AND VIDEO PROCESSING METHOD

BACKGROUND

The present disclosure relates to a video processing apparatus and a video processing method.

There are video signal transmission systems in which fast imaging is performed with high resolution in an imaging device and a resultant video signal is transmitted from the imaging device to a signal processing apparatus. In such a video signal transmission system, control is performed according to a speed of a video signal output by the signal processing apparatus so that the video signal with the speed is transmitted from the imaging device to the signal processing apparatus. Further, in the imaging device, a feedback process such as a gain control process and an auto iris level detection process, a KNEE process, a gamma correction process, and the like are performed on the video signal. Further, in the signal processing apparatus, for example, a color correction process is serially performed on the video signal resulting from fast imaging.

Since the speed of the video signal transmitted from the imaging device to the signal processing apparatus is controlled according to the speed of the video signal output by the signal processing apparatus, a processing amount in the imaging device is great, the system is difficult to miniaturize, and power consumption increases. However, a technique for reducing the processing amount in the imaging device and suppressing degradation of image quality of the video signal output by the signal processing apparatus when the video signal generated by the imaging device is transmitted to the signal processing apparatus is disclosed, for example, in Japanese Patent Laid-open Publication No. 2007-104623.

SUMMARY

There is no system capable of simultaneously outputting a 1× (1080/59.94i) video signal when outputting a 2× (1080/119.91 or twice of 1080/59.94i) video signal from a video acquired by an imaging device.

However, when the 2× video signal and the 1× video signal are simultaneously output, it is necessary to generate a 1× video signal from the 2× video signal. If the generation of the 1× video signal is not studied, it is difficult to output the 1× video signal without delay from the 2× video signal, and the other video signal is delayed.

The present disclosure has been made in view of the circumstances described above, and an object of the present disclosure is to provide a video processing apparatus and a video processing method that are novel and enhanced and capable of generating a 1× video signal from a 2× video signal and outputting the 1× video signal without delay from the 2× video signal.

According to the present disclosure, there is provided a video processing apparatus including a video addition unit for receiving two systems of input interlaced video signals each including two fields, and adding the two systems of video signals to generate a ½× video signal of the input interlaced video signal. The video addition unit adds a second field of the interlaced video signal of one system among the two systems and a first field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems.

According to the present disclosure, there is provided a video processing apparatus including a video addition unit for receiving two systems of input interlaced video signals each including two fields, and adding the two systems of video signals to generate a ½× video signal of the input interlaced video signal. The video addition unit adds a second field of the interlaced video signal of one system and a first field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems. By doing this, it is possible to generate a 1× video signal from a 2× video signal. Further, since 1× video signal is generated from a 2× video signal by adding video without filtering process, it is possible to output a 1× video signal from a 2× video signal without delaying.

According to the present disclosure, there is provided a video processing apparatus including a video addition unit for receiving two systems of input interlaced video signals each including two fields, and adding the two systems of video signals to generate a ½× video signal of the input interlaced video signal. The video addition unit adds a second field of the interlaced video signal of one system among the two systems and a first field of the interlaced video signal of the other system to generate the ½× video signal of the input interlaced video signal, validates a horizontal line in a vertical blanking interval beneath one row of a bottom line of valid lines in the first field of the interlaced video signal of the other system when the ½× video signal is generated, and then adds the video signals of the two systems.

According to the present disclosure, there is provided a video processing apparatus including a video addition unit for receiving two systems of input interlaced video signals each including two fields, and adding the two systems of video signals to generate a ½× video signal of the input interlaced video signal. The video addition unit adds a first field of the interlaced video signal of one system among the two systems and a first field of the interlaced video signal of the other system and adds a second field of the interlaced video signal of the one system and a second field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems.

According to the present disclosure, there is provided a video processing apparatus including a video addition unit for receiving two systems of input interlaced video signals each including two fields, and adding the two systems of video signals to generate a ½× video signal of the input interlaced video signal. The video addition unit adds a first field of the interlaced video signal of one system among the two systems and a first field of the interlaced video signal of the other system and adds a second field of the interlaced video signal of the one system and a second field of the interlaced video signal of the other system to generate the ½× video signal of the input interlaced video signal, subjects the interlaced video signal of the other system to be shifted up by 1 horizontal line when the ½× video signal is generated, validates a horizontal line in a vertical blanking interval under one row of a bottom line of valid lines in the second field of the interlaced video signal of the other system, and then adds the video signals of the two systems.

According to the present disclosure, there is provided a video processing apparatus including a video addition unit for receiving two systems of input interlaced video signals each including two fields, and adding the two systems of video signals to generate a ½× video signal of the input interlaced video signal. Video signals of an (n+1)-th field and an (n+4)-th field are transmitted in one system among the two systems of interlaced video signals, and video signals of an (n+2)-th field and an (n+3)-th field are transmitted in the other system (n is an integer equal to or more than 0), and the video addition unit adds a first field of the interlaced video signal of the one system among the two systems and a first field of the interlaced video signal of the other system and adds a second field of the interlaced video signal of the one system and a second field of the interlaced video signal of the other system to generate the ½× video signal of the input interlaced video signal.

According to the present disclosure, there is provided a video processing method including receiving two systems of input interlaced video signals each including two fields, and adding the two systems of video signals to generate a ½× video signal of the interlaced video signal input in the receiving step. The video addition step includes adding a second field of the interlaced video signal of one system among the two systems and a first field of the interlaced video signal of the other system to generate the ½× video signal of the input interlaced video signal input in the receiving step, subjecting the interlaced video signal of the other system by 1 horizontal line delay when the ½× video signal is generated, validating a horizontal line in a vertical blanking interval on one row of a top line of valid lines in the first field, and then adding the video signals of the two systems.

According to the present disclosure, there is provided a video processing method including receiving two systems of input interlaced video signals each including two fields, and adding the two systems of video signals to generate a ½× video signal of the interlaced video signal input in the receiving step. The video addition step includes adding a second field of the interlaced video signal of one system among the two systems and a first field of the interlaced video signal of the other system to generate the ½× video signal of the input interlaced video signal input in the receiving step, validating a horizontal line in a vertical blanking interval beneath one row of a bottom line of valid lines in the first field when the ½× video signal is generated, and then adding the video signals of the two systems.

According to the present disclosure, there is provided a video processing method including receiving two systems of input interlaced video signals each including two fields, and adding the two systems of video signals to generate a ½× video signal of the interlaced video signal input in the receiving step. The video addition step includes adding a first field of the interlaced video signal of one system among the two systems and a first field of the interlaced video signal of the other system and adding a second field of the interlaced video signal of the one system and a second field of the interlaced video signal of the other system to generate the ½× video signal of the input interlaced video signal, subjecting the interlaced video signal of the other system to 1 horizontal line delay when the ½× video signal is generated, validating a horizontal line in a vertical blanking interval on one row of a top line of valid lines in the first field of the interlaced video signal of the other system, and then adding video signals of the two systems.

According to the present disclosure, there is provided a video processing method including receiving two systems of input interlaced video signals each including two fields, and adding the two systems of video signals to generate a ½× video signal of the interlaced video signal input in the receiving step. The video addition step includes adding a first field of the interlaced video signal of one system among the two systems and a first field of the interlaced video signal of the other system and adding a second field of the interlaced video signal of the one system and a second field of the interlaced video signal of the other system to generate the ½× video signal of the input interlaced video signal, subjecting the interlaced video signal of the other system to be shifted up by 1 horizontal line when the ½× video signal is generated, validating a horizontal line in a vertical blanking interval under one row of a bottom line of valid lines in the second field of the interlaced video signal of the other system, and then adding video signals of the two systems.

According to the present disclosure, there is provided a video processing method including receiving two systems of input interlaced video signals each including two fields, and adding the two systems of video signals to generate a ½× video signal of the interlaced video signal input in the receiving step. Video signals of an (n+1)-th field and an (n+4)-th field are transmitted in one system among the two systems of interlaced video signals input in the receiving step, and video signals of an (n+2)-th field and an (n+3)-th field are transmitted in the other system (n is an integer equal to or more than 0), and the video addition step includes adding a first field of the interlaced video signal of the one system among the two systems and a first field of the interlaced video signal of the other system and adding a second field of the interlaced video signal of the one system and a second field of the interlaced video signal of the other system to generate the ½× video signal of the input interlaced video signal.

According to the present disclosure as described above, it is possible to provide a video processing apparatus and a video processing method that are novel and enhanced and capable of generating a 1× video signal from a 2× video signal and outputting the 1× video signal without delay from the 2× video signal.

BRIEF DESCRIPTION OF THE DRAWINGS

FIG. 7 is an illustrative diagram showing an example in which a 1× video signal is generated as a pseudo-interlaced video signal;

FIG. 15 is an illustrative diagram showing an example in which a 1× video signal is generated as a pseudo-interlaced video signal.

DETAILED DESCRIPTION OF THE EMBODIMENT(S)

Figure 1:
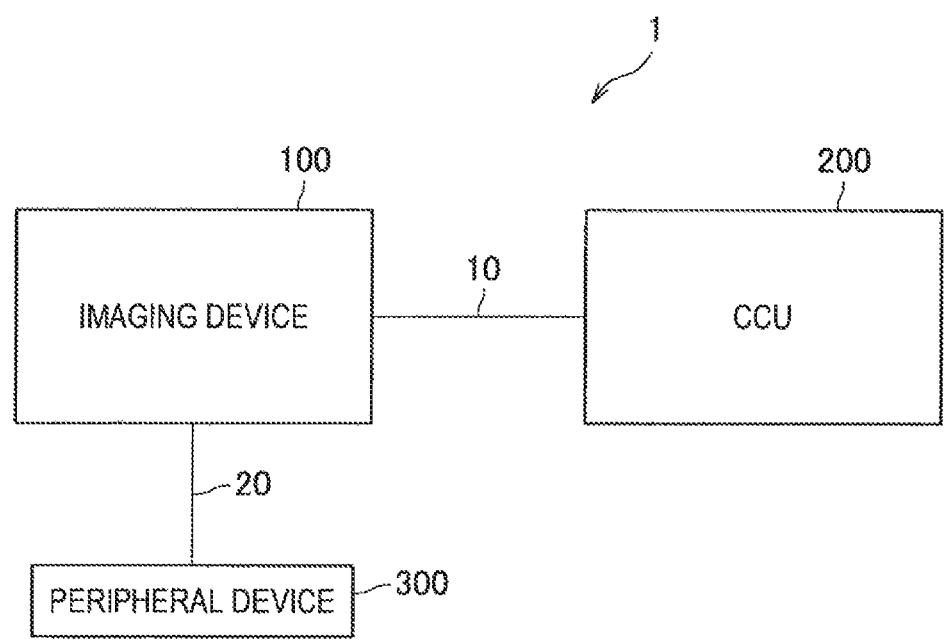
FIG. 1 is an illustrative diagram showing a configuration of a video system 1 according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be made in the following order.
<1. First Embodiment of the Present Disclosure>
[1-1. Configuration of Video System]
[1-2. Functional Configuration of Imaging Device and CCU]
[1-3. Operation of Image System]
<2. Second Embodiment of the Present Disclosure>
<3. Third Embodiment of the Present Disclosure>
<4. Fourth Embodiment of the Present Disclosure>
<5. Fifth Embodiment of the Present Disclosure>
<6. Conclusion>

1. First Embodiment of the Present Disclosure

1-1. Configuration of Image System

First, a configuration of a video system according to a first embodiment of the present disclosure will be described with reference to the accompanying drawings. FIG. 1 is an illustrative diagram showing a configuration of a video system 1 according to the first embodiment of the present disclosure. Hereinafter, the configuration of the video system 1 according to the first embodiment of the present disclosure will be described with reference to FIG. 1.

As shown in FIG. 1, the video system 1 according to the first embodiment of the present disclosure includes an imaging device 100 and a CCU (Camera Control Unit) 200. The imaging device 100 and the CCU 200 are connected to each other via a video cable 10. The video cable 10 may include, for example, an optical fiber cable. The video cable 10 corresponds to, for example, HD-SDI or 3G-SDI that is a video transmission standard. The connection of the imaging device 100 with the CCU 200 via the video cable 10 enables dual link input and output of a video or transmission of two systems of video signals between the imaging device 100 and the CCU 200.

The imaging device 100 images a subject and generates a video signal according to the imaging result. The imaging device 100 generates, as the video signal, a 1080P signal or a 1080I/4:4:4 signal. The imaging device 100 generates, as the 1080P signal or the 1080I/4:4:4 signal, an m-bit quantization signal for broadcast (m is 10 or 12). The video signal generated by the imaging device 100 is transmitted to the CCU 200 via the video cable 10. The imaging device 100 functions as a video transmission device for transmitting the video signal.

As shown in FIG. 1, a peripheral device 300 may be connected to the imaging device 100. The imaging device 100 and the peripheral device 300 are connected to each other via an Ethernet cable 20 such that an operation of the peripheral device 300 can be controlled from the imaging device 100.

Only one imaging device 100 is shown in FIG. 1, but it is understood that the present disclosure is not limited to such an example and a plurality of imaging devices 100 may be connected to the CCU 200 via separate video cables 10. Further, a state in which the peripheral device 300 is connected to only the imaging device 100 is shown in FIG. 1, but it is understood that the present disclosure is not limited to such an example, and the peripheral device may also be connected to the CCU 200 or may be connected to only the CCU 200.

The CCU 200 is a unit for controlling the imaging device 100, receiving a video signal from the imaging device 100, or transmitting a video signal (return video) for causing a monitor of an imaging device 100 to display a video photographed by another imaging device 100 when there are a plurality of imaging devices 100. The CCU 200 functions as a video receiving device for receiving the video signal from the imaging device 100.

The configuration of the video system 1 according to the first embodiment of the present disclosure has been described above with reference to FIG. 1. Next, functional configurations of the imaging device 100 and the CCU 200 according to the first embodiment of the present disclosure will be described.

1-2. Functional Configuration of Imaging Device and CCU

Figure 2:
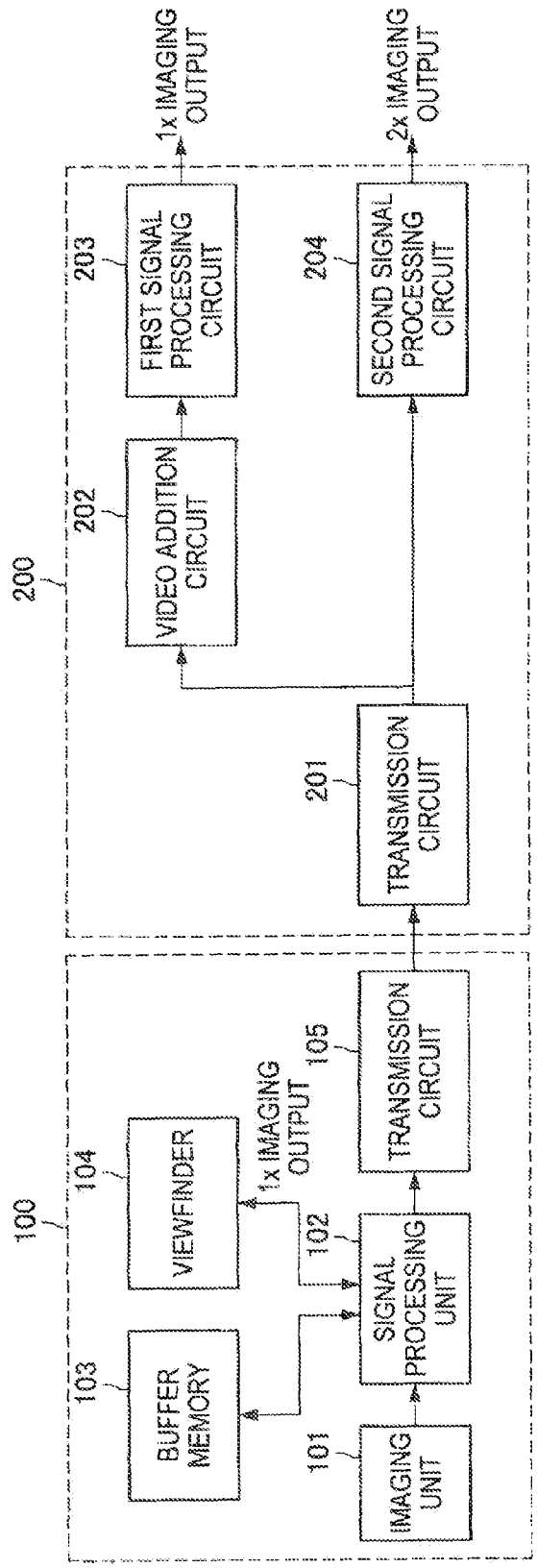
FIG. 2 is an illustrative diagram showing a functional configuration of an imaging device 100 and a CCU 200 according to the first embodiment of the present disclosure.

FIG. 2 is an illustrative diagram showing functional configurations of the imaging device 100 and the CCU 200 according to the first embodiment of the present disclosure. Hereinafter, the functional configurations of the imaging device 100 and the CCU 200 according to the first embodiment of the present disclosure will be described with reference to FIG. 2.

As shown in FIG. 2, the imaging device 100 according to the first embodiment of the present disclosure includes an imaging unit 101, a signal processing unit 102, a buffer memory 103, a viewfinder 104, and a transmission circuit 105. The CCU 200 according to the first embodiment of the present disclosure includes a transmission circuit 201, a video addition circuit 202, a first signal processing circuit 203, and a second signal processing circuit 204.

First, the functional configuration of the imaging device 100 according to the first embodiment of the present disclosure will be described. The imaging unit 101 performs photographing of a subject and generates a video signal resulting from the photographing. The imaging unit 101 includes an imaging element (not shown) such as a CCD image sensor or a CMOS image sensor, and the imaging element generates the video signal. The imaging unit 101 performs fast imaging at 2× speed of a standard speed to generate an interlaced video signal and outputs the generated video signal to the signal processing unit 102. Further, optical imaging onto the imaging unit 101 is adjusted by a throttle mechanism (not shown). Further, the imaging result of the imaging unit 101 is subjected to given gain control and then output as an analog video signal.

The signal processing unit 102 performs signal processing on the video signal. The signal processing unit 102 performs writing of the video signal subjected to signal processing to the buffer memory 103, output of the video signal stored in the buffer memory 103 to the viewfinder 104, and output of the video signal subjected to signal processing to the transmission circuit 105.

The buffer memory 103 stores the video signal that has been signal-processed in the signal processing unit 102. Further, the viewfinder 104 displays a video based on the video signal stored in the buffer memory 103 under control of the signal processing unit 102.

Figure 3:
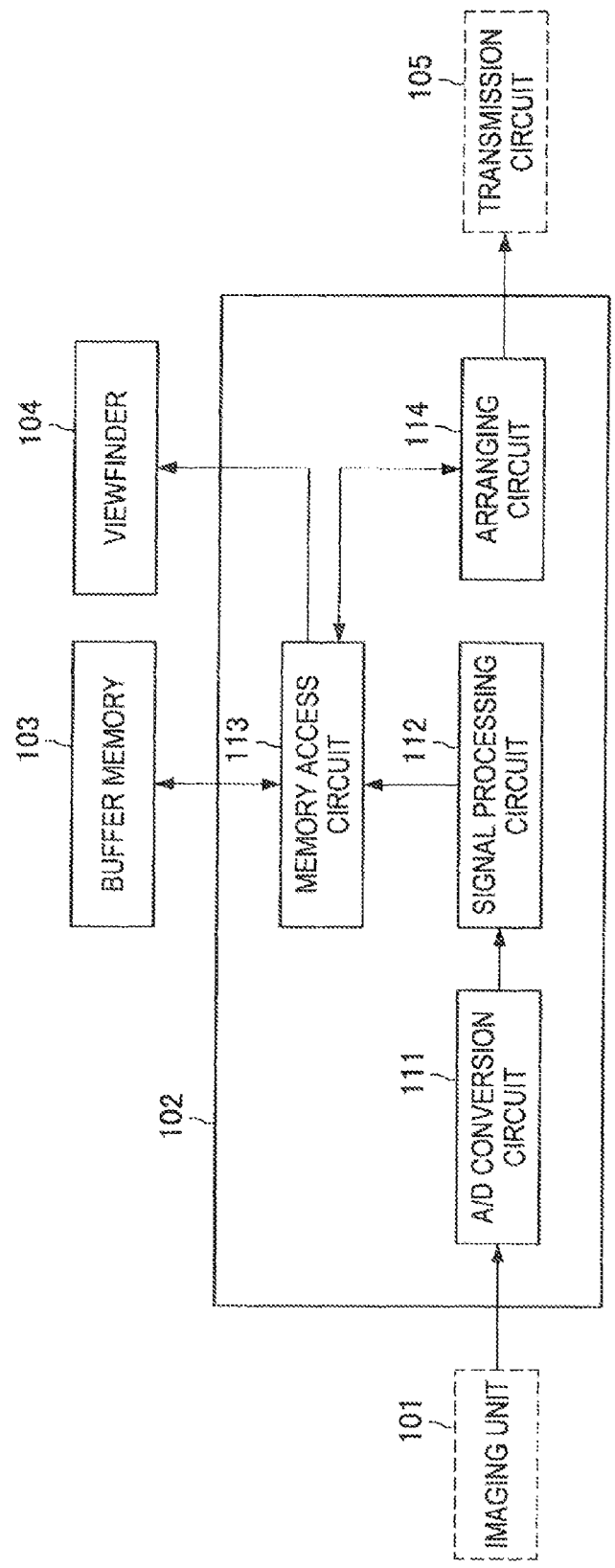
FIG. 3 is an illustrative diagram showing an exemplary configuration of a signal processing unit 102 included in the imaging device 100 according to the first embodiment of the present disclosure.

FIG. 3 is an illustrative diagram showing an exemplary configuration of the signal processing unit 102 included in the imaging device 100 according to the first embodiment of the present disclosure.

As shown in FIG. 3, the signal processing unit 102 includes an A/D conversion circuit 111, a signal processing circuit 112, a memory access circuit 113, and an arranging circuit 114.

The A/D conversion circuit 111 converts the analog video signal output by the imaging unit 101 into a digital video signal. The A/D conversion circuit 111 outputs the digital video signal to the signal processing circuit 112.

The signal processing circuit 112 performs given signal processing, such as gain control or an auto iris level detection process, on the digital video signal output by the A/D conversion circuit 111. The signal processing circuit 112 outputs the video signal subjected to given signal processing to the memory access circuit 113.

The memory access circuit 113 writes the video signal output by the signal processing circuit 112 to the buffer memory 103. Further, the memory access circuit 113 reads the video signal from the buffer memory 103 and outputs a 1× video signal to the viewfinder 104. Since the imaging unit 101 performs fast imaging at 2× speed of the standard speed and generates the interlaced video signal, the memory access circuit 113 adds the 2× video signal to generate the 1× video signal and outputs the generated 1× video signal to the viewfinder 104, similar to a video addition circuit 202 in a camera control unit 200, which will be described later. A process of generating the 1× video signal through 2× video signal addition in the memory access circuit 113 will be described in detail later.

The arranging circuit 114 arranges the video signal that the memory access circuit 113 reads from the buffer memory 103, in a given order, and outputs the resultant video signal to the transmission circuit 105.

The transmission circuit 105 transmits the video signal output by the arranging circuit 114 to the CCU 200 via the video cable 20. The transmission circuit 105 is capable of transmitting the 2× video signal to the CCU 200 via the video cable 20.

Figure 4:
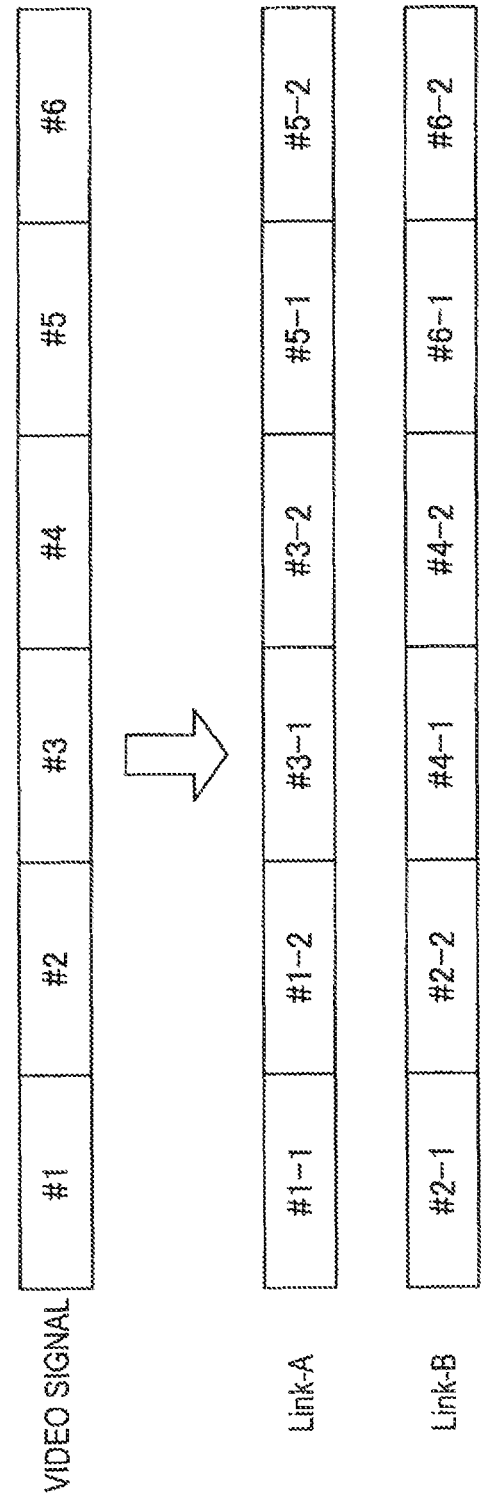
FIG. 4 is an illustrative diagram showing an example in which video signals of two systems of link-A and link-B are produced when a video signal is output from the signal processing unit 102 to a transmission circuit 105.

FIG. 4 is an illustrative diagram showing an example in which video signals of two systems of link-A and link-B are produced when the video signal is output from the signal processing unit 102 to the transmission circuit 105. Thus, one frame is divided into two fields and transmitted, as video signals of two systems of link-A and link-B, from the signal processing unit 102 to the transmission circuit 105.

The functional configuration of the imaging device 100 according to the first embodiment of the present disclosure has been described above. Next, the functional configuration of the CCU 200 according to the first embodiment of the present disclosure will be described.

The transmission circuit 201 receives the video signal transmitted from the imaging device 100 via the video cable 20. The video signal received by the transmission circuit 201 is transmitted to the first signal processing circuit 203 via the video addition circuit 202. The video signal received by the transmission circuit 201 is also transmitted to the second signal processing circuit 204.

The video addition circuit 202 adds the 2× video signal transmitted from the transmission circuit 201 to generate a 1× video signal and outputs the 1× video signal to the first signal processing circuit 203. A process of generating a 1× video signal through 2× video signal addition in the video addition circuit 202 will be described in detail later.

The first signal processing circuit 203 performs signal processing, for example, an image quality improvement process or a compression process, on the 1× video signal generated by the video addition circuit 202 and outputs the resultant signal. Similarly, the second signal processing circuit 204 performs signal processing, such as an image quality improvement process or a compression process, on the 2× video signal output by the transmission circuit 201 and outputs the resultant signal.

Examples of signal processing performed by the first signal processing circuit 203 and the second signal processing circuit 204 include a KNEE process (a process of reducing a processing burden in color processing by compressing pixel data), a gamma correction process (a process of causing an input value to be close to an ideal output value in order to obtain vibrant colors), a detail process, etc.

The functional configuration of the CCU 200 according to the first embodiment of the present disclosure has been described above. Next, an operation of the video system 1 according to the first embodiment of the present disclosure will be described.

1-3. Operation of Video System

First, the imaging unit 101 of the imaging device 100 generates a video signal of a video according to the result of imaging an imaging target. The video signal generated by the imaging unit 101 is an analog video signal. The analog video signal generated by the imaging unit 101 is transmitted to the signal processing unit 102, particularly, the A/D conversion circuit 111.

The A/D conversion circuit 111 converts the analog video signal generated by the imaging unit 101 into a digital video signal and outputs the digital video signal to the signal processing circuit 112. The signal processing circuit 112 performs given signal processing, such as gain control or an auto iris level detection process, on the digital video signal output by the A/D conversion circuit 111. If the signal processing circuit 112 performs given signal processing on the video signal, the memory access circuit 113 writes the video signal to the buffer memory 103.

The arranging circuit 114 acquires the video signal written to the buffer memory 103 via the memory access circuit 113. The arranging circuit 114 arranges the acquired video signal to be arranged in chronological order and outputs the arranged video signal to the transmission circuit 105.

The transmission circuit 105 transmits the video signal output by the arranging circuit 114 to the CCU 200 via the video cable 20. Here, the transmission circuit 105 is capable of transmitting a 2× video signal to the CCU 200 via the video cable 20.

The transmission circuit 201 of the CCU 200 receives the 2× video signal transmitted from the imaging device 100 via the video cable 20. The transmission circuit 201 outputs the received 2× video signal to the video addition circuit 202 and the second signal processing circuit 204.

The video addition circuit 202 converts the 2× video signal transmitted from the transmission circuit 201 into a 1× video signal through a given addition process, and outputs the 1× video signal to the first signal processing circuit 203.

The first signal processing circuit 203 performs signal processing, such as an image quality improvement process or a compression process, on the 1× video signal generated by the video addition circuit 202 and outputs the resultant signal. Similarly, the second signal processing circuit 204 performs signal processing, such as an image quality improvement process or a compression process, on the 2× video signal output by the transmission circuit 201 and outputs the resultant signal.

Here, a process of generating the 1× video signal through 2× video signal addition in the memory access circuit 113 or the video addition circuit 202 will be described in detail.

Figure 5:
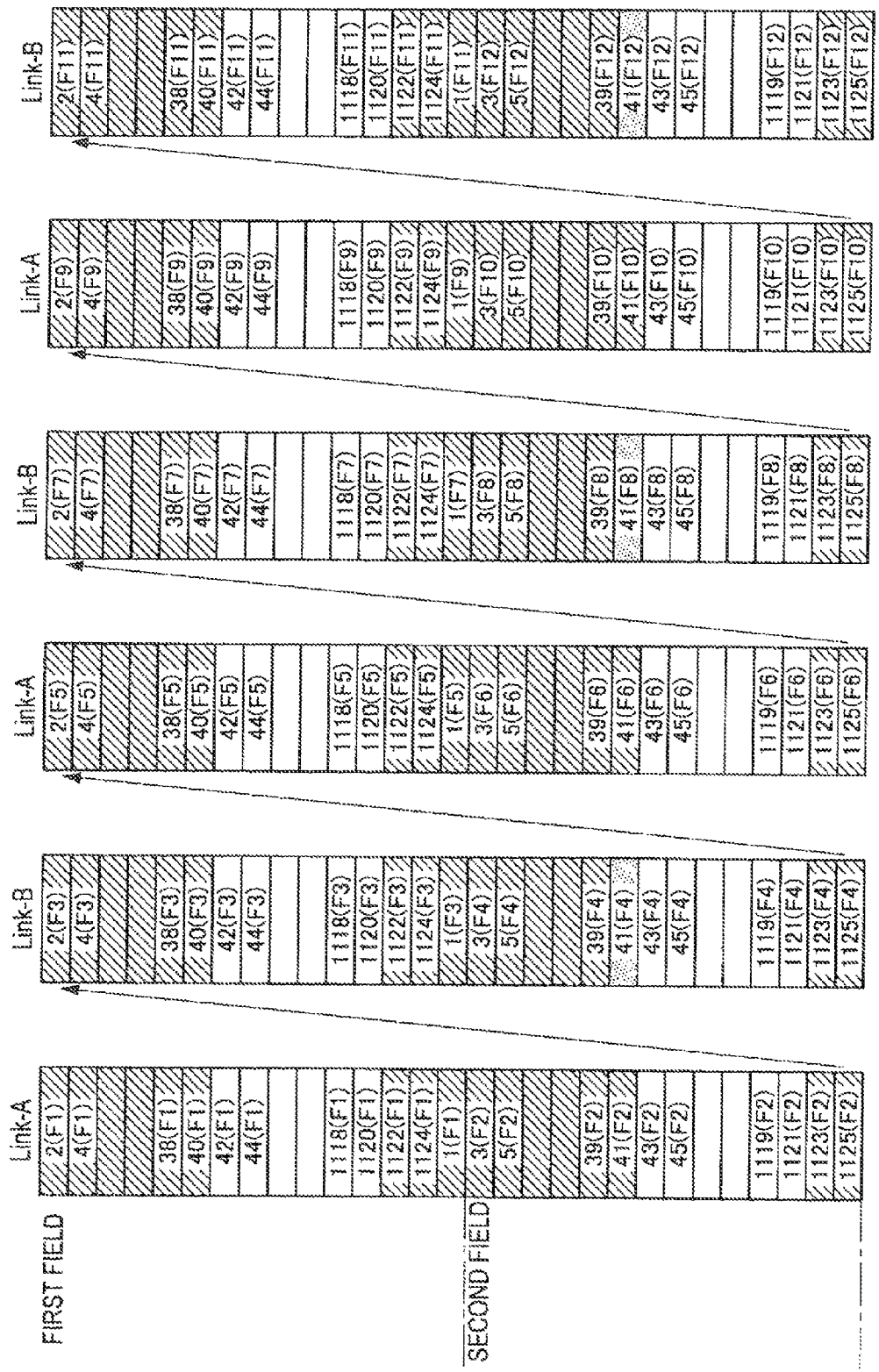
FIG. 5 is an illustrative diagram showing an output format of a 2× video signal.

The 2× video signal is separated into two systems (link-A and link-B) and transmitted in 2 systems. FIG. 5 is an illustrative diagram showing an output format of the 2× video signal. First, videos of first and second fields are transmitted in link-A that is a first system, and subsequently, videos of first and second fields are transmitted in link-B that is a second system. Then, link-A and link-B are divided by two fields, respectively, and videos are sequentially transmitted.

As shown in FIG. 5, even-numbered scan lines among 1125 scan lines are arranged in the first field, and odd-numbered scan lines among the 1125 scan lines are arranged in the second field.

Here, in link-A and link-B, lines 2 to 40, 1122, 1124 and 1 of the first field and lines 3 to 41, 1123 and 1125 of the second field are blanking lines, and lines 42 to 1120 of the first field and lines 43 to 1121 of the second field are active (valid) lines.

In order to generate the 1× video signal from the 2× video signal, the second field (F2, F4, F6, . . . ) of link-A and the second field (F3, F5, F7, . . . ) of link-B are added to each other. Accordingly, odd-even conversion for replacing the first field and the second field with each other in the 2× video signal may be considered as a method of generating the 1× video signal from the 2× video signal. This is a method in which, specifically, the 2× video signal passes a digital filter for odd-even conversion and a video of link-A and a video of link-B are added.

However, in the method using a digital filter for odd-even conversion, signal delay occurs according to the number of taps of the digital filter. Accordingly, with the method using a digital filter for odd-even conversion, it is difficult to output the 1× video without delay from the 2× video. The 1× video may suffer from delay of 1 frame or more in comparison with the 2× video according to performance of the digital filter.

In the first embodiment of the present disclosure, when the 1× video signal is generated from the 2× video signal, one field of the other system is subjected to 1 line delay and then added to realize simultaneous output of the 2× video and the 1× video. Hereinafter, a method of generating the 1× video signal from the 2× video signal through a 2× video signal addition process will be described in detail.

Figure 6:
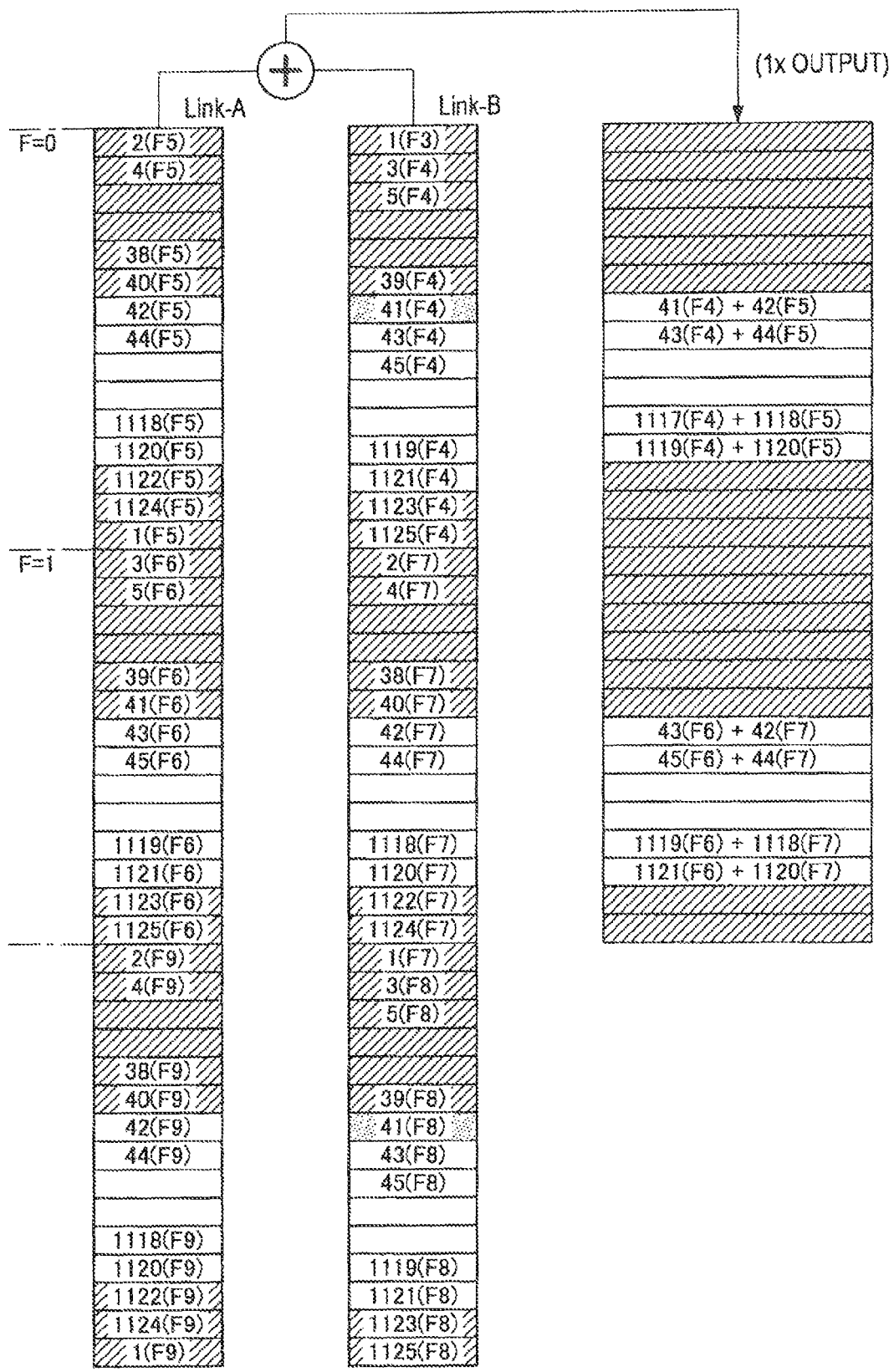
FIG. 6 is an illustrative diagram showing a process of generating a 1× video signal through 2× video signal addition according to the first embodiment of the present disclosure.

FIG. 6 is an illustrative diagram showing a process of generating a 1× video signal through 2× video signal addition in the memory access circuit 113 or the video addition circuit 202 according to the first embodiment of the present disclosure.

In order to generate the 1× video signal from the 2× video signal through a 2× video signal addition process, the memory access circuit 113 or the video addition circuit 202 subjects link-B to 1 horizontal line delay and validates line 41 of link-B, which has remained as a blanking line (a horizontal line in the vertical blanking interval). Line 41 of link-A is kept as the blanking line. The memory access circuit 113 or the video addition circuit 202 adds the video signal of link-A and the video signal of link-B in a state in which line 41 of link-B has been validated.

The memory access circuit 113 or the video addition circuit 202 adds the video signal of link-A and the video signal of link-B in a state in which line 41 of link-B has been validated. Here, valid lines in the first field when displayed on the screen are from a line obtained by adding line 41 of link-B and line 42 of link-A to a line obtained by adding line 1119 of link-B and line 1120 of link-A, as shown in FIG. 6. Further, valid lines in the second field are from a line obtained by adding line 43 of link-B and line 42 of link-A to a line obtained by adding line 1121 of link-B and line 1120 of link-A, as shown in FIG. 6.

Thus, as the added lines in the first and second fields are shifted by one line, the 1× video signal becomes a pseudo-interlaced video signal. FIG. 7 is an illustrative diagram showing an example in which the 1× video signal is generated as a pseudo-interlaced video signal as the added lines in the first and second fields are shifted by one line. Interlacing refers to first transmitting odd-numbered scan lines and then transmitting even-numbered scan lines to thereby complete a video. Accordingly, if the same lines in the first and second fields are added, a visual point is not changed in the first and second fields, resulting in a non-interlaced image.

Figure 8:
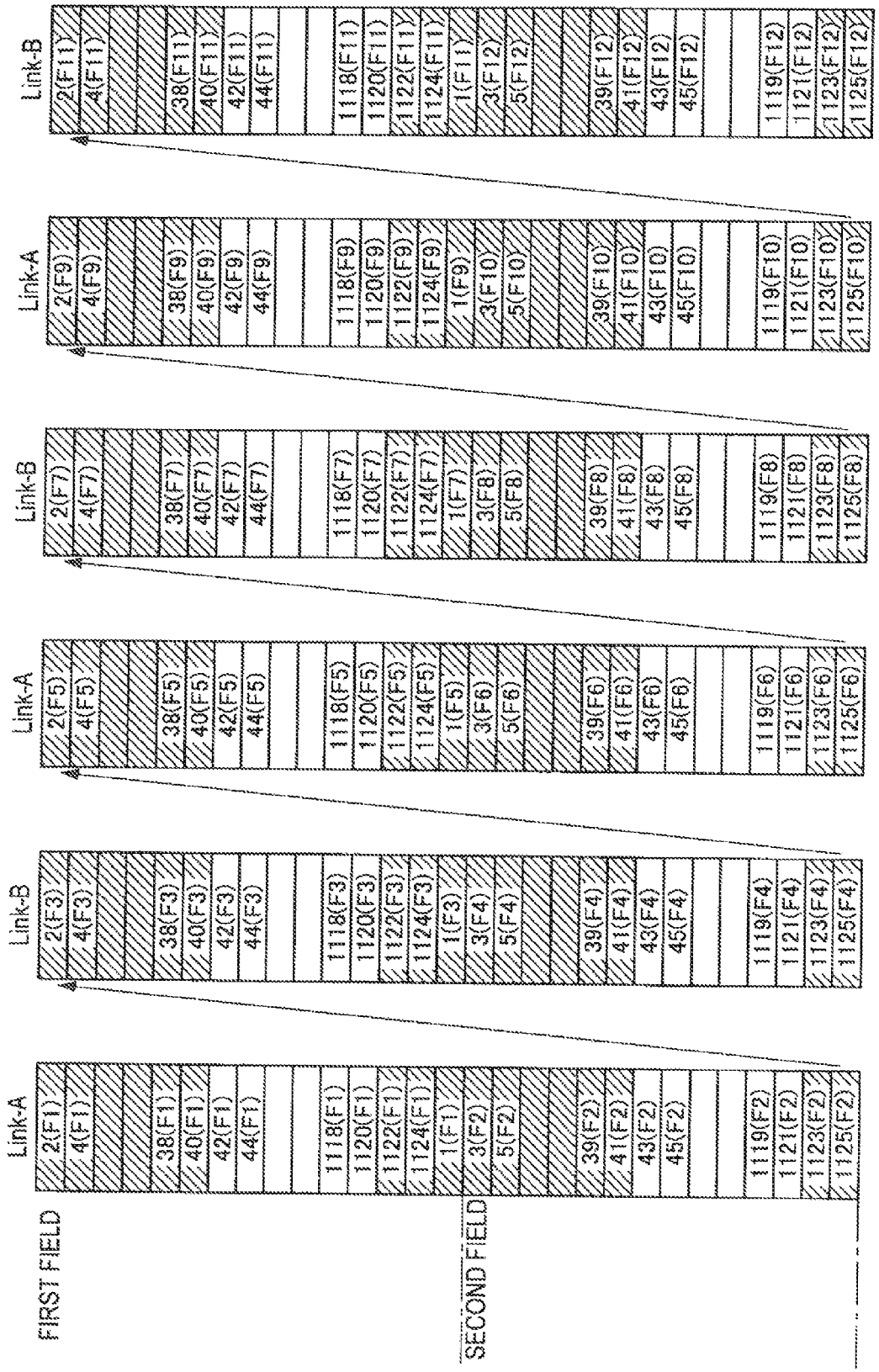
FIG. 8 is an illustrative diagram showing an output format of a 2× video signal.

Line 41 of link-B is validated only when a process of generating a 1× video signal through 2× video signal addition is performed by the memory access circuit 113 or the video addition circuit 202, and line 41 of link-B remains as a blanking line when the 2× video signal is output. FIG. 8 is an illustrative diagram showing an output format of the 2× video signal. As shown in FIG. 8, when the 2× video is output, the 2× video is output in a state in which link-B is not subjected to 1 horizontal line delay and line 41 of link-B remains as the blanking line.

Thus, in the process of generating a 1× video signal through 2× video signal addition in the memory access circuit 113 or the video addition circuit 202, the video signal of link-B is subjected to 1 horizontal line delay, line 41 of link-B that has remained as the blanking line is validated, and the video signal of link-A and the video signal of link-B are added. As the video signal of link-A and the video signal of link-B are added as described above, the 1× video and the 2× video can be simultaneously output without delay of the 1× video from the first signal processing circuit 203 and the second signal processing circuit 204 in the CCU 200. Further, as the addition target lines are different between the first and second fields, the 1× video can be obtained as a pseudo-interlaced signal.

2. Second Embodiment of the Present Disclosure

In the first embodiment of the present disclosure as described above, in the process of generating a 1× video signal through 2× video signal addition, the video signal of link-B among two systems of interlaced video signals is subjected to 1 horizontal line delay, line 41 of link-B that has remained as the blanking line is validated, and the video signal of link-A and the video signal of link-B are added.

In a second embodiment of the present disclosure that will be described hereinafter, a process of generating a 1× video signal through 2× video signal addition is realized using a different method from that in the first embodiment of the present disclosure. Specifically, a case in which a 1× video signal generated by not delaying the video signal of link-B among two systems of interlaced video signals, by validating line 1122 of link-B that has remained as a blanking line, and by adding the video signal of link-A and the video signal of link-B will be described. Further, since configurations of the imaging device and the CCU according to the second embodiment of the present disclosure are the same as those of the imaging device 100 and the CCU 200 according to the first embodiment of the present disclosure, a detailed description thereof will be omitted.

Figure 9:
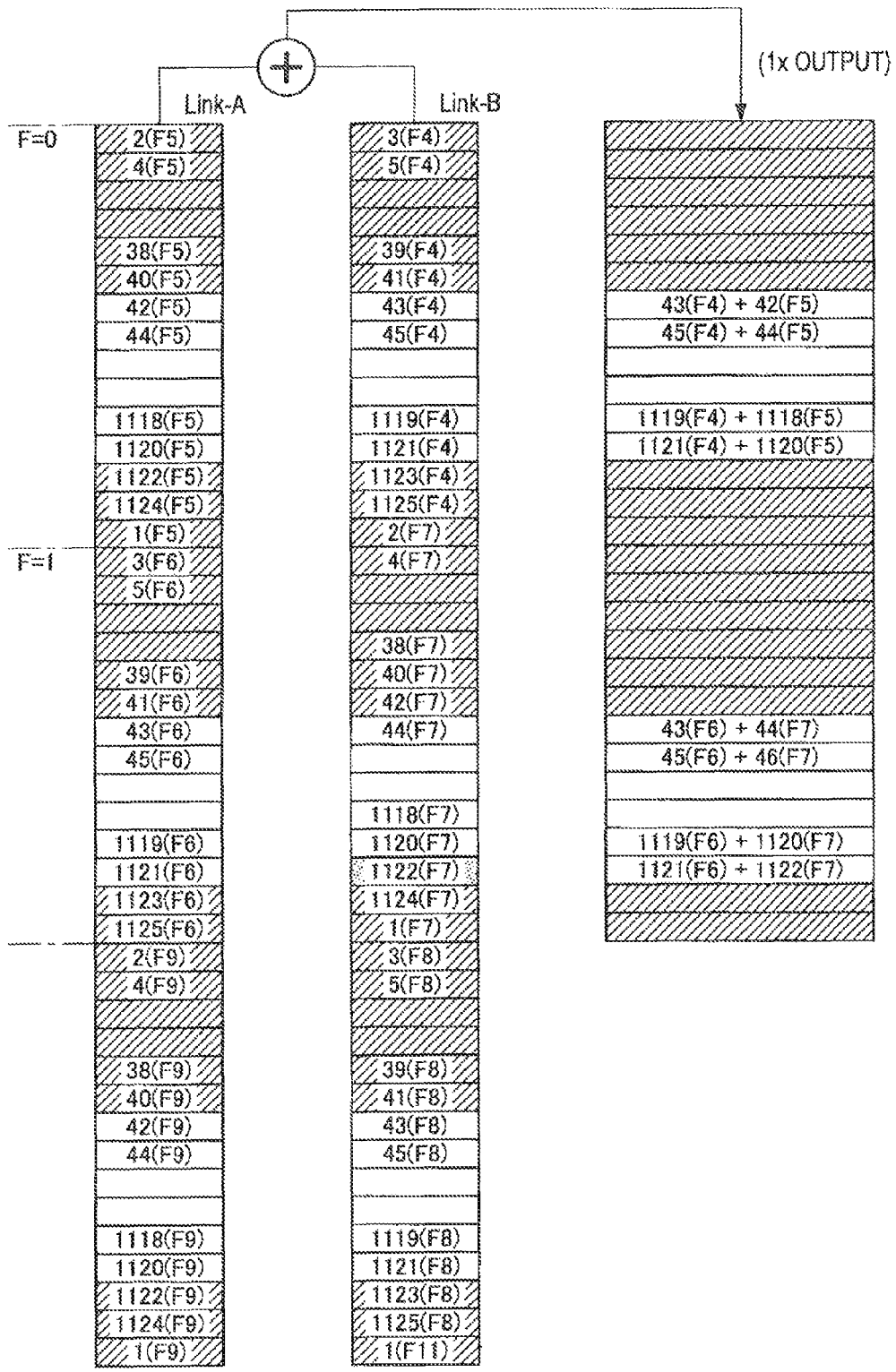
FIG. 9 is an illustrative diagram showing an example in which a 1× video signal is generated as a pseudo-interlaced video signal according to a second embodiment of the present disclosure.

FIG. 9 is an illustrative diagram showing a process of generating a 1× video signal through 2× video signal addition in the memory access circuit 113 or the video addition circuit 202 according to the second embodiment of the present disclosure. In order to generate the 1× video signal from the 2× video signal, the memory access circuit 113 or the video addition circuit 202 validates line 1122 of link-B that has remained as a blanking line. Line 1122 of link-A remains as a blanking line. The memory access circuit 113 or the video addition circuit 202 adds the video signal of link-A and the video signal of link-B in a state in which line 1122 of link-B has been validated.

The memory access circuit 113 or the video addition circuit 202 adds the video signal of link-A to the video signal of link-B in a state in which line 1122 of link-B has been validated. Here, valid lines in the first field when displayed on the screen are from a line obtained by adding line 42 of link-A and line 43 of link-B to a line obtained by adding line 1120 of link-A and line 1121 of link-B, as shown in FIG. 9. Further, valid lines in the second field are from a line obtained by adding line 43 of link-A and line 44 of link-B to a line obtained by adding line 1121 of link-A and line 1122 of link-B, as shown in FIG. 9.

As the lines in the first and second fields added by the memory access circuit 113 or the video, addition circuit 202 are shifted by one line as described above, the 1× video signal becomes a pseudo-interlaced video signal, similar to the first embodiment.

Line 1122 of link-B is validated only when the process of generating a 1× video signal through 2× video signal addition is performed by the memory access circuit 113 or the video addition circuit 202. Line 1122 of link-B remains as the blanking line when the 2× video signal is output.

Thus, in the process of generating a 1× video signal through 2× video signal addition in the memory access circuit 113 or the video addition circuit 202, line 1122 of link-B that has remained as a blanking line is validated, and the video signal of link-A and the video signal of link-B are added. As the video signal of link-A and the video signal of link-B are added as described above, the 1× video and the 2× video can be simultaneously output without delay of the 1× video in the CCU 200. Further, as the addition target lines are different between the first and second fields, the 1× video can be obtained as a pseudo-interlaced signal.

3. Third Embodiment of the Present Disclosure

In the first and second embodiments of the present disclosure described above, line 41 of link-B or line 1122 of link-B, which has remained as the blanking line, is validated and the video signal of link-A and the video signal of link-B are added to generate the 1× video signal from the 2× video signal. In these embodiments, videos of the first and second fields are transmitted in link-A and videos of the first and second fields are transmitted in link-B. Then, link-A and link-B are divided into 2 fields, respectively, and then the videos are sequentially transmitted.

In a third embodiment of the present disclosure that will be described hereinafter, a method of generating the 1× video signal from the 2× video signal by transmitting the video of the first field in link-A and the video of the second field in link-B and adding the video signal of link-A and the video signal of link-B will be described. Since configurations of an imaging device and a CCU according to the third embodiment of the present disclosure are the same as those of the imaging device 100 and the CCU 200 according to the first embodiment of the present disclosure, a detailed description thereof will be omitted.

Figure 10:
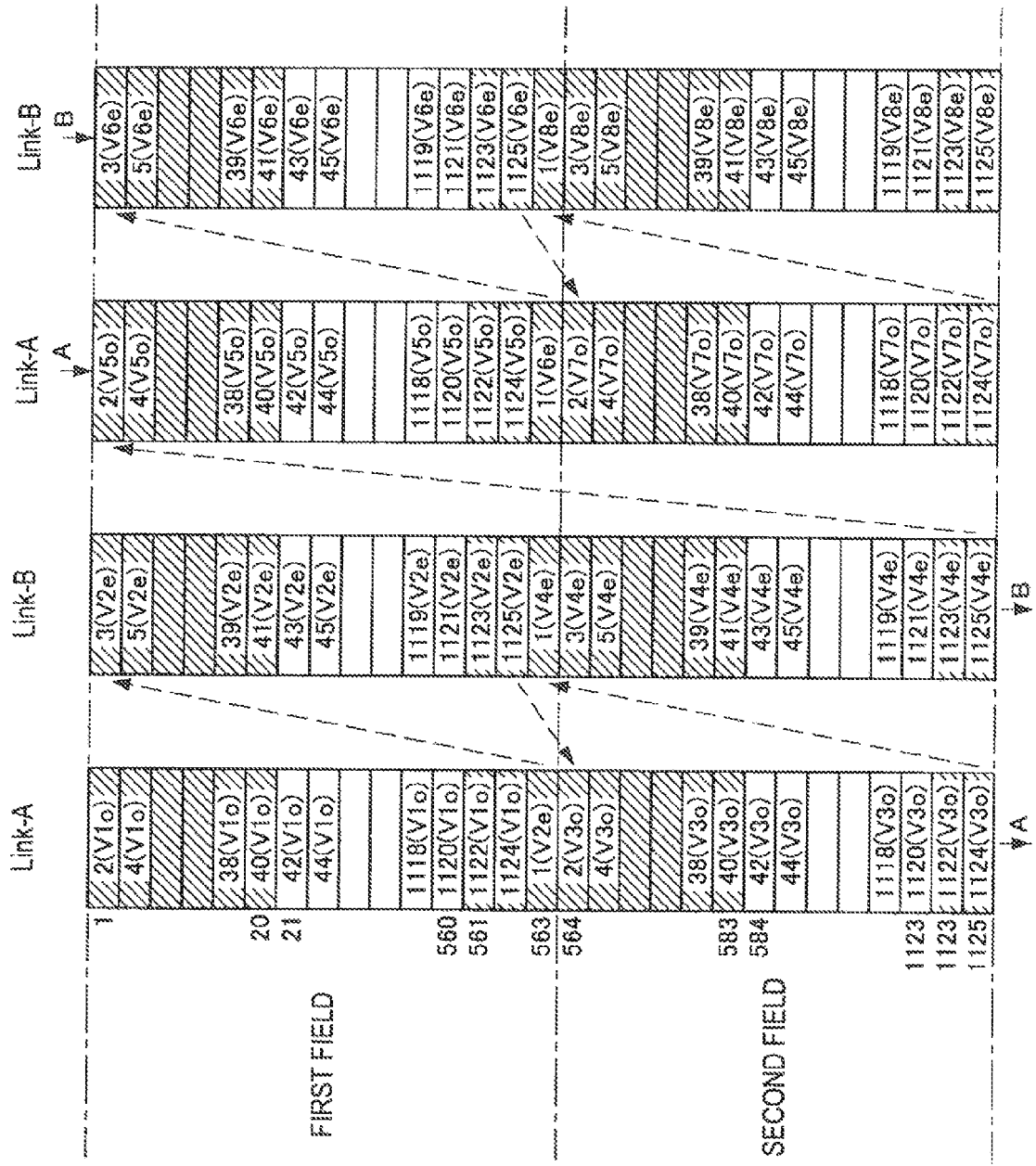
FIG. 10 is an illustrative diagram showing an output format of a 2× video signal.

First, an output format of the 2× video signal when the video of the first field is transmitted in link-A and the video of the second field is transmitted in link-B will be described as the premise of the third embodiment of the present disclosure that will be described hereinafter. FIG. 10 is an illustrative diagram showing the output format of the 2× video signal. The output format of the 2× video signal when the video of the first field is transmitted in link-A and the video of the second field is transmitted in link-B, unlike FIG. 5, is shown.

Videos (V1$o$, V3$o$, V5$o$, . . . ) of the first field are transmitted in link-A, and videos (V2$e$, V4$e$, V6$e$, . . . ) of the second field are transmitted in link-B. In FIG. 10, for convenience of illustration, link-A and link-B are each shown as two columns. In fact, since the transmitted video signal is a 120$i$ signal, there is a time lag of 1V between link-A and link-B.

A line number of the video signal shown in FIG. 10 is a progressive representation. Further, line 1 of the video of the second field transmitted in link-B is stored in line 563 of the first field of link-A.

Here, lines 2 to 40, 1122, 1124 and 1 of link-A, and lines 3 to 41, 1123, 1125, and 1 of link-B are blanking lines, and lines 42 to 1120 of link-A and lines 43 to 1121 of link-B are active (valid) lines.

In order to generate the 1× video signal from the 2× video signal that is transmitted as described above, only the first field of link-B is subjected to 1 horizontal line delay with data of line 41 of the first field of link-B kept when the video signal is transmitted, and then the video signal of link-A and the video signal of link-B are added. Thus, the 1× video signal can be generated from the 2× video signal. Hereinafter, a process of generating a 1× video signal through 2× video signal addition in the third embodiment of the present disclosure will be described in detail.

Figure 11:
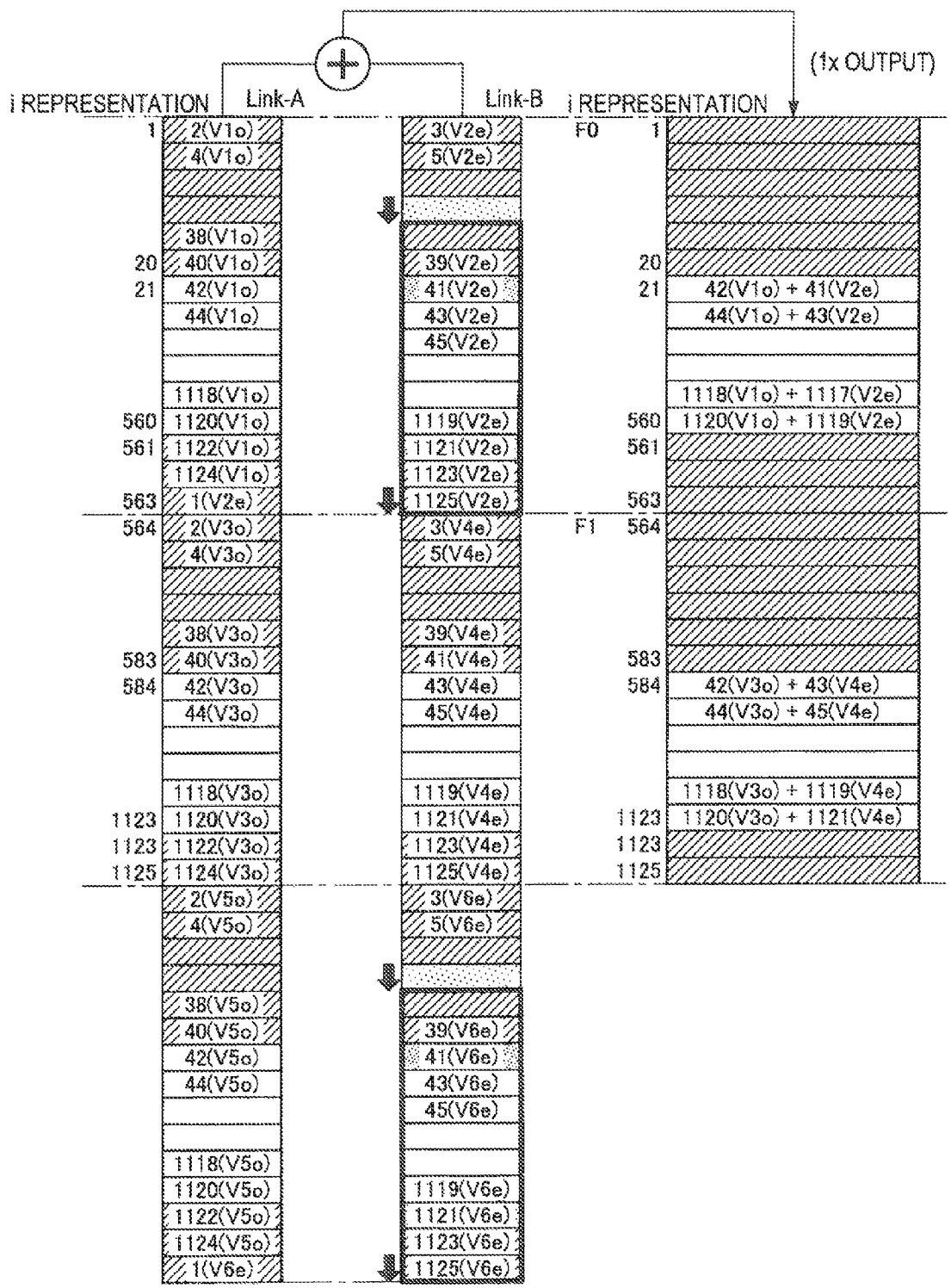
FIG. 11 is an illustrative diagram showing an example in which a 1× video signal is generated as a pseudo-interlaced video signal according to a third embodiment of the present disclosure.

FIG. 11 is an illustrative diagram showing a process of generating a 1× video signal through 2× video signal addition in the memory access circuit 113 or the video addition circuit 202 according to the third embodiment of the present disclosure.

In order to generate the 1× video signal from the 2× video signal through a 2× video signal addition process, the memory access circuit 113 or the video addition circuit 202 subjects only the first field of link-B to 1 horizontal line delay, and validates line 41 of link-B that has remained as a blanking line (a horizontal line in a vertical blanking interval). The memory access circuit 113 or the video addition circuit 202 adds the video signal of link-A and the video signal of link-B in a state in which line 41 of link-B has been validated.

The memory access circuit 113 or the video addition circuit 202 adds the video signal of link-A and the video signal of link-B in a state in which line 41 of the first field of link-B has been validated. Here, valid lines in the first field when displayed on the screen are from a line obtained by adding line 41 of link-B and line 42 of link-A to a line obtained by adding line 1119 of link-B and line 1120 of link-A, as shown in FIG. 11. Further, valid lines in the second field are from a line obtained by adding line 43 of link-B and line 42 of link-A to a line obtained by adding line 1121 of link-B and line 1120 of link-A, as shown in FIG. 11. As the added lines in the first and second fields are shifted by one line as described above, the 1× video signal obtained by the addition becomes a pseudo-interlaced video signal.

Thus, in the process of generating a 1× video signal through 2× video signal addition in the memory access circuit 113 or the video addition circuit 202, only the first field of the video signal of link-B is subjected to 1 horizontal line delay, line 41 of the first field of link-B that has remained as a blanking line is validated, and the video signal of link-A and the video signal of link-B are added. As the video signal of link-A and the video signal of link-B are added as described above, the 1× video and the 2× video can be simultaneously output without delay of the 1× video, from the first signal processing circuit 203 and the second signal processing circuit 204 in the CCU 200. Further, as the addition target lines are different between the first and second fields, the 1× video can be obtained as a pseudo-interlaced signal.

4. Fourth Embodiment of the Present Disclosure

In the third embodiment of the present disclosure described above, in the process of generating a 1× video signal through 2× video signal addition, only the first field of the video signal of link-B among two systems of interlaced video signals is subjected to 1 horizontal line delay, line 41 of the first field of link-B that has remained as a blanking line is validated, and the video signal of link-A and the video signal of link-B are added.

In a fourth embodiment of the present disclosure that will be described hereinafter, a process of generating a 1× video signal through 2× video signal addition when the 2× video signal is transmitted in a manner that the video of the first field is transmitted in link-A and the video of the second field is transmitted in link-B as shown in FIG. 10 is realized using a different method from that in the third embodiment of the present disclosure.

Specifically, a case in which a 1× video signal is generated by not subjecting the video signal of link-B among two systems of interlaced video signals to delay, keeping data of line 1122 of the second field of link-A in transmission, validating line 1122 of the second field of link-A that has remained as a blanking line, and adding the video signal of link-A and the video signal of link-B will be described. Further, since configurations of an imaging device and a CCU according to the fourth embodiment of the present disclosure are the same as those of the imaging device 100 and the CCU 200 according to the first embodiment of the present disclosure, a detailed description thereof will be omitted.

Figure 12:
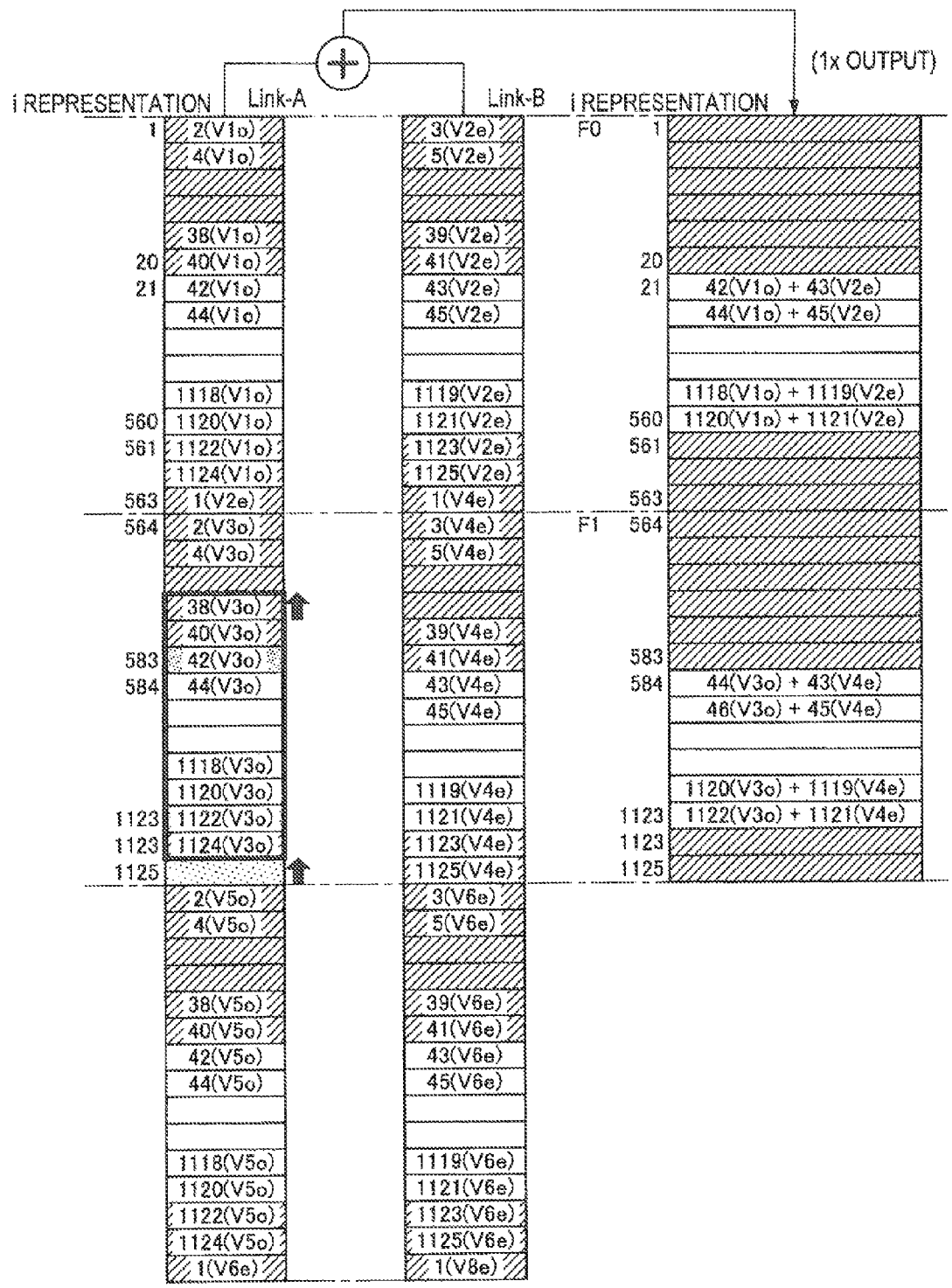
FIG. 12 is an illustrative diagram showing an example in which a 1× video signal is generated as a pseudo-interlaced video signal according to a fourth embodiment of the present disclosure.

FIG. 12 is an illustrative diagram showing a process of generating a 1× video signal through 2× video signal addition in the memory access circuit 113 or the video addition circuit 202 according to the fourth embodiment of the present disclosure. In order to generate the 1× video signal from the 2× video signal, the memory access circuit 113 or the video addition circuit 202 validates line 1122 of the second field of link-A that has remained as the blanking line. The memory access circuit 113 or the video addition circuit 202 adds the video signal of link-A and the video signal of link-B in a state in which line 1122 of the second field of link-A has been validated and the second field of link-A is shifted up by 1 horizontal line.

The memory access circuit 113 or the video addition circuit 202 adds the video signal of link-A and the video signal of link-B in a state in which line 1122 of the second field of link-A has been validated. Here, valid lines in the first field when displayed on the screen are from a line obtained by adding line 42 of link-A and line 43 of link-B to a line obtained by adding line 1120 of link-A and line 1121 of link-B, as shown in FIG. 12. Further, valid lines in the second field are from a line obtained by adding line 44 of link-A and line 43 of link-B to a line obtained by adding line 1122 of link-A and line 1121 of link-B, as shown in FIG. 12.

As the lines in the first and second fields added in the memory access circuit 113 or the video addition circuit 202 are shifted by one line, the 1× video signal becomes a pseudo-interlaced video signal, similar to the first embodiment.

In the process of generating a 1× video signal through 2× video signal addition in the memory access circuit 113 or the video addition circuit 202, line 1122 of link-B that has remained as the blanking line is validated, and the video signal of link-A and the video signal of link-B are added. As the video signal of link-A and the video signal of link-B are added as described above, the 1× video and the 2× video can be simultaneously output without delay of the 1× video in the CCU 200. Further, as the addition target lines are different between the first and second fields, the 1× video can be obtained as a pseudo-interlaced signal.

5. Fifth Embodiment of the Present Disclosure

In the fourth embodiment of the present disclosure as described above, the video signal of link-B among two systems of interlaced video signals is not subjected to delay, data of line 1122 of the second field of link-A is kept in transmission, line 1122 of the second field of link-A that has remained as the blanking line is validated, and the video signal of link-A and the video signal of link-B are added.

Figure 13:
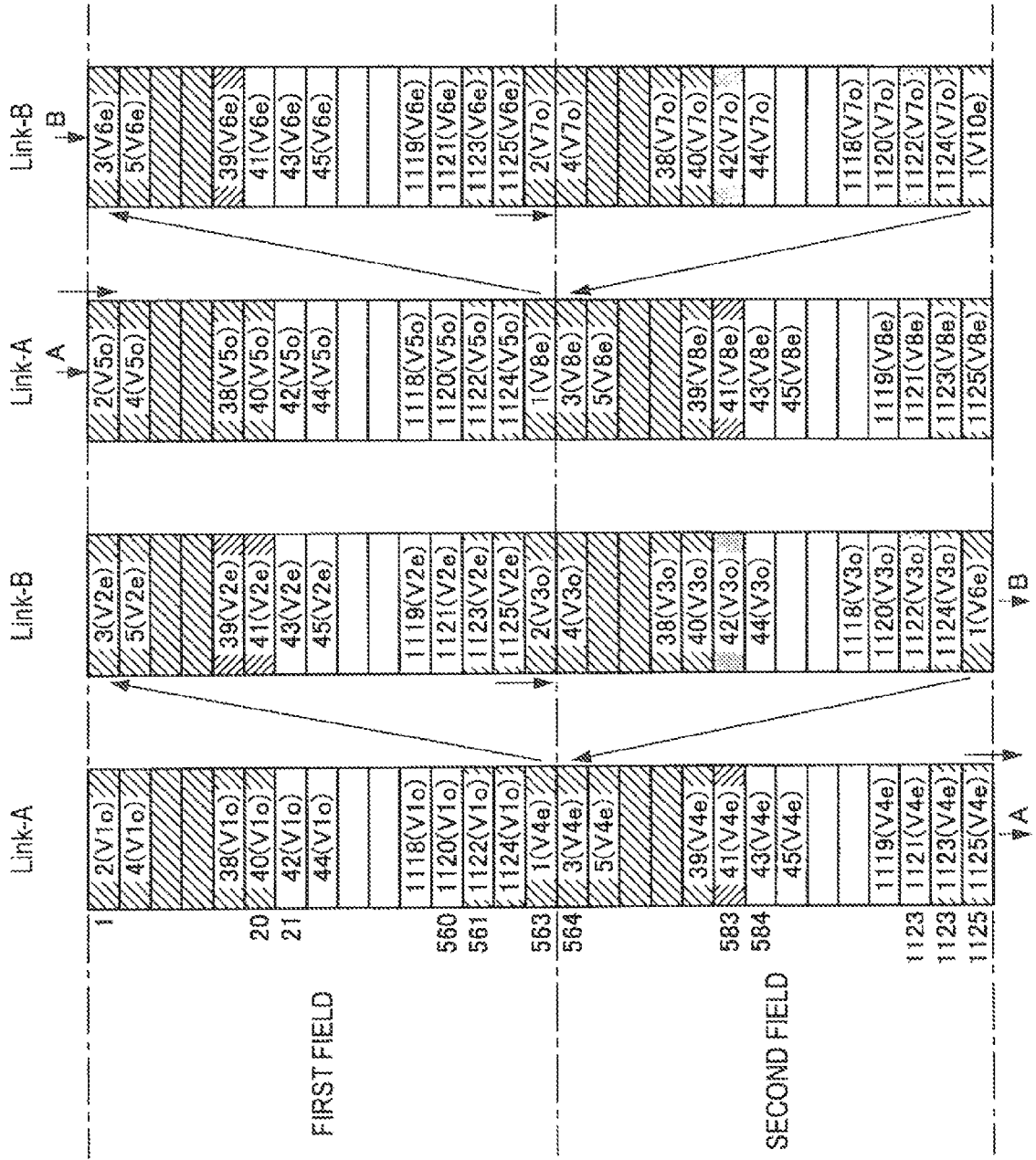
FIG. 13 is an illustrative diagram showing another output format of a 2× video signal.

In a fifth embodiment of the present disclosure that will be described hereinafter, a process of generating a 1× video signal through 2× video signal addition when a 2× video signal is transmitted in such a manner that a video is transmitted as shown in FIG. 13 is realized using a different method from that in each embodiment of the present disclosure described above.

Specifically, video signals of first and fourth fields are transmitted in link-A, and video signals of the second and third fields are transmitted in link-B. Then, such video transmission is iteratively performed in units of 4 fields. A case in which the 1× video signal is generated by simply adding the video signal of link-A and the video signal of link-B will be described. Further, since configurations of an imaging device and a CCU according to the fifth embodiment of the present disclosure are the same as those of the imaging device 100 and the CCU 200 according to the first embodiment of the present disclosure, a detailed description thereof will be omitted.

Figure 14:
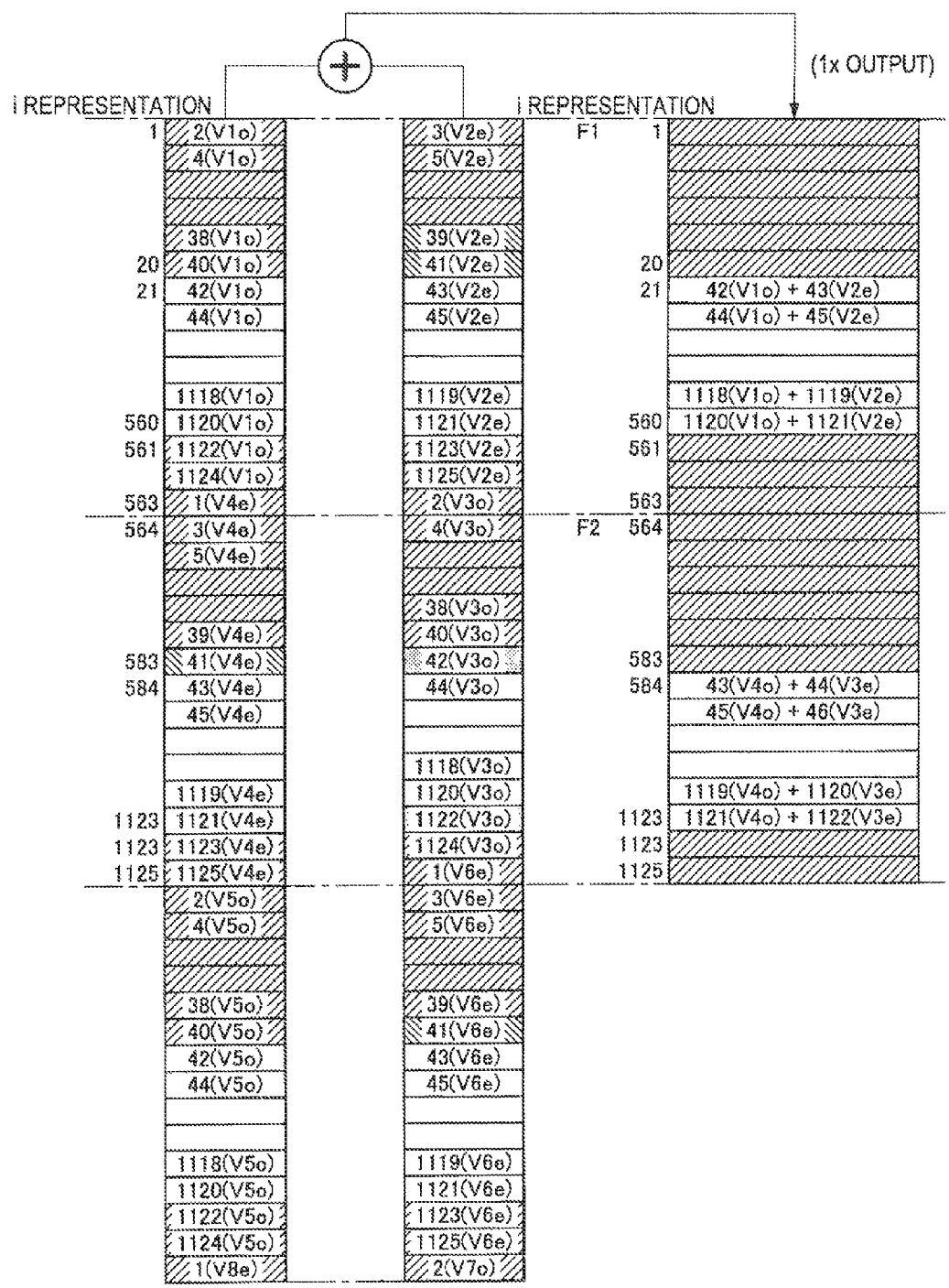
FIG. 14 is an illustrative diagram showing an example in which a 1× video signal is generated as a pseudo-interlaced video signal according to a fifth embodiment of the present disclosure.

FIG. 14 is an illustrative diagram showing a process of generating a 1× video signal through 2× video signal addition in the memory access circuit 113 or the video addition circuit 202 according to the fifth embodiment of the present disclosure. In order to generate a 1× video signal from a 2× video signal, the memory access circuit 113 or the video addition circuit 202 validates line 1122 of the second field of link-B that has remained as the blanking line. The memory access circuit 113 or the video addition circuit 202 validates line 1122 of the second field of link-B and simply adds the video signal of link-A and the video signal of link-B.

The memory access circuit 113 or the video addition circuit 202 simply adds the video signal of link-A and the video signal of link-B in a state in which line 1122 of the second field of link-B has been validated. Here, valid lines in the first field when displayed on the screen are from a line obtained by adding line 42 of link-A and line 43 of link-B to a line obtained by adding line 1120 of link-A and line 1121 of link-B, as shown in FIG. 14. Further, valid lines in the second field are from a line obtained by adding line 43 of link-A and line 44 of link-B to a line obtained by adding line 1121 of link-A and line 1122 of link-B, as shown in FIG. 14.

As the lines in the first and second fields added by the memory access circuit 113 or the video addition circuit 202 are shifted by one line as described above, the 1× video signal becomes a pseudo-interlaced video signal, similar to the first embodiment.

In the process of generating a 1× video signal through 2× video signal addition in the memory access circuit 113 or the video addition circuit 202, line 1122 of link-B that has remained as the blanking line is validated, and the video signal of link-A and the video signal of link-B are added. As the video signal of link-A and the video signal of link-B are added as described above, the 1× video and the 2× video can be simultaneously output without delay of the 1× video in the CCU 200. Further, as addition target lines are different between the first and second fields, the 1× video can be obtained as a pseudo-interlaced signal.

FIG. 15 is an illustrative diagram showing an example in which a 1× video signal is generated as a pseudo-interlaced video signal as added lines in the first and second fields are shifted by one line in the method of generating a 1× video signal according to the fifth embodiment of the present disclosure. Interlacing refers to first transmitting odd-numbered scan lines and then transmitting even-numbered scan lines to thereby complete a video. Accordingly, if the same lines in the first and second fields are added, a visual point is not changed in the first and second fields, resulting in a non-interlaced video.

6. Conclusion

According to the first embodiment of the present disclosure as described above, when the 2× video signal and the 1× video signal are simultaneously output from the CCU 200, the memory access circuit 113 or the video addition circuit 202 performs the video data addition process on the 2× video signal to generate the 1× video signal. When the video addition circuit 202 generates the 1× video signal, the video signal of link-B is subjected to 1 horizontal line delay, line 41 of link-B that has remained as the blanking line is validated, and the video signal of link-A and the video signal of link-B are added.

According to the second embodiment of the present disclosure as described above, when the 2× video signal and the 1× video signal are simultaneously output from the CCU 200, the memory access circuit 113 or the video addition circuit 202 performs the video data addition process on the 2× video signal to generate the 1× video signal. When the video addition circuit 202 generates the 1× video signal, line 1122 of link-B that has remained as the blanking line is validated and the video signal of link-A and the video signal of link-B are added.

As the video signal of link-A and the video signal of link-B are added as described above, the 1× video and the 2× video can be simultaneously output without delay of the 1× video. Furthermore, as the addition target lines are different between the first and second fields, the 1× video can also be obtained as a pseudo-interlaced signal.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

A video processing apparatus including:

a video addition unit for receiving two systems of input interlaced video signals each including two fields, and adding the two systems of video signals to generate a ½× video signal of the input interlaced video signal, wherein the video addition unit adds a second field of the interlaced video signal of one system among the two systems and a first field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems.

(2)

The video processing apparatus according to (1), including:

a first video signal output unit for outputting the ½× video signal of the input video signal generated by the video addition unit; and a second video signal output unit for outputting the two systems of input interlaced video signals.

(3)

The video processing apparatus according to (2), wherein the video signal output by the first video signal output unit and the video signal output by the second video signal output unit are output at the same timing.

(4)

The video processing apparatus according to any one of (1) to (3), further including:

a video display unit for displaying the ½× video signal of the input video signal generated by the video addition unit.

(5)

The video processing apparatus according to any one of (1) to (4), wherein:

the two systems of interlaced video signals conform to an HD-SDI (High Definition-Serial Digital Interface) standard.

(6)

A video processing apparatus including:

a video addition unit for receiving two systems of input interlaced video signals each including two fields, and adding the two systems of video signals to generate a ½× video signal of the input interlaced video signal, wherein the video addition unit adds a second field of the interlaced video signal of one system among the two systems and a first field of the interlaced video signal of the other system to generate the ½× video signal of the input interlaced video signal, validates a horizontal line in a vertical blanking interval beneath one row of a bottom line of valid lines in the first field of the interlaced video signal of the other system when the ½× video signal is generated, and then adds the video signals of the two systems.

(7)

A video processing apparatus including:

a video addition unit for receiving two systems of input interlaced video signals each including two fields, and adding the two systems of video signals to generate a ½× video signal of the input interlaced video signal, wherein the video addition unit adds a first field of the interlaced video signal of one system among the two systems and a first field of the interlaced video signal of the other system and adds a second field of the interlaced video signal of the one system and a second field of the interlaced video signal of the other system to generate the ½× video signal of the input interlaced video signal, subjects the interlaced video signal of the other system to 1 horizontal line delay when the ½× video signal is generated, validates a horizontal line in a vertical blanking interval on one row of a top line of valid lines in the first field of the interlaced video signal of the other system, and then adds the video signals of the two systems.

(8)

A video processing apparatus including:

a video addition unit for receiving two systems of input interlaced video signals each including two fields, and adding the two systems of video signals to generate a ½× video signal of the input interlaced video signal, wherein the video addition unit adds a first field of the interlaced video signal of one system among the two systems and a first field of the interlaced video signal of the other system and adds a second field of the interlaced video signal of the one system and a second field of the interlaced video signal of the other system to generate the ½× video signal of the input interlaced video signal, subjects the interlaced video signal of the other system to be shifted up by 1 horizontal line when the ½× video signal is generated, validates a horizontal line in a vertical blanking interval under one row of a bottom line of valid lines in the second field of the interlaced video signal of the other system, and then adds the video signals of the two systems.

(9)

A video processing apparatus including:

a video addition unit for receiving two systems of input interlaced video signals each including two fields, and adding the two systems of video signals to generate a ½× video signal of the input interlaced video signal, wherein video signals of an (n+1)-th field and an (n+4)-th field are transmitted in one system among the two systems of interlaced video signals, and video signals of an (n+2)-th field and an (n+3)-th field are transmitted in the other system (n is an integer equal to or more than 0), and the video addition unit adds a first field of the interlaced video signal of the one system among the two systems and a first field of the interlaced video signal of the other system and adds a second field of the interlaced video signal of the one system and a second field of the interlaced video signal of the other system to generate the ½× video signal of the input interlaced video signal.

(10)

A video processing method including:

receiving two systems of input interlaced video signals each including two fields; and adding the two systems of video signals to generate a ½× video signal of the interlaced video signal input in the receiving step, wherein the video addition step includes adding a second field of the interlaced video signal of one system among the two systems and a first field of the interlaced video signal of the other system to generate the ½× video signal of the input interlaced video signal input in the receiving step, subjecting the interlaced video signal of the other system to 1 horizontal line delay when the ½× video signal is generated, validating a horizontal line in a vertical blanking interval on one row of a top line of valid lines in the first field, and then adding the video signals of the two systems.

(11)

A video processing method including:

receiving two systems of input interlaced video signals each including two fields; and adding the two systems of video signals to generate a ½× video signal of the interlaced video signal input in the receiving step, wherein the video addition step includes adding a second field of the interlaced video signal of one system among the two systems and a first field of the interlaced video signal of the other system to generate the ½× video signal of the input interlaced video signal input in the receiving step, validating a horizontal line in a vertical blanking interval beneath one row of a bottom line of valid lines in the first field when the ½× video signal is generated, and then adding the video signals of the two systems.

(12)

A video processing method including:

receiving two systems of input interlaced video signals each including two fields; and adding the two systems of video signals to generate a ½× video signal of the interlaced video signal input in the receiving step, wherein the video addition step includes adding a first field of the interlaced video signal of one system among the two systems and a first field of the interlaced video signal of the other system and adding a second field of the interlaced video signal of the one system and a second field of the interlaced video signal of the other system to generate the ½× video signal of the input interlaced video signal, subjecting the interlaced video signal of the other system to 1 horizontal line delay when the ½× video signal is generated, validating a horizontal line in a vertical blanking interval on one row of a top line of valid lines in the first field of the interlaced video signal of the other system, and then adding video signals of the two systems.

(13)

A video processing method including:

receiving two systems of input interlaced video signals each including two fields; and adding the two systems of video signals to generate a ½× video signal of the interlaced video signal input in the receiving step, wherein the video addition step includes adding a first field of the interlaced video signal of one system among the two systems and a first field of the interlaced video signal of the other system and adding a second field of the interlaced video signal of the one system and a second field of the interlaced video signal of the other system to generate the ½× video signal of the input interlaced video signal, subjecting the interlaced video signal of the other system to be shifted up to 1 horizontal line when the ½× video signal is generated, validating a horizontal line in a vertical blanking interval under one row of a bottom line of valid lines in the second field of the interlaced video signal of the other system, and then adding video signals of the two systems.

(14)

A video processing method including:

receiving two systems of input interlaced video signals each including two fields; and adding the two systems of video signals to generate a ½× video signal of the interlaced video signal input in the receiving step, wherein video signals of an (n+1)-th field and an (n+4)-th field are transmitted in one system among the two systems of interlaced video signals input in the receiving step, and video signals of an (n+2)-th field and an (n+3)-th field are transmitted in the other system (n is an integer equal to or more than 0), and the video addition step includes adding a first field of the interlaced video signal of the one system among the two systems and a first field of the interlaced video signal of the other system and adding a second field of the interlaced video signal of the one system and a second field of the interlaced video signal of the other system to generate the ½× video signal of the input interlaced video signal.

The present disclosure contains subject matter related to that disclosed in Japanese Priority Patent Application JP 2011-085852 filed in the Japan Patent Office on Apr. 8, 2011, Japanese Priority Patent Application JP 2011-137187 filed in the Japan Patent Office on Jun. 21, 2011, and Japanese Priority Patent Application JP 2010-224538 filed in the Japan Patent Office on Oct. 12, 2011 the entire content of which is hereby incorporated by reference.

What is claimed is:

1. A video processing apparatus comprising:
a video addition unit operable to:
   receive a first interlaced video signal and a second interlaced video signal, wherein each of the first and the second interlaced video signals comprises a first field and a second field, and wherein each field of the first and the second interlaced video signals comprises a plurality of blanking lines and a plurality of valid lines; and
   add the first and the second interlaced video signals to generate a third interlaced video signal, wherein the third interlaced video signal is ½× of the first interlaced video signal,
      wherein to add the first and the second interlaced video signals, the video addition unit is operable to:
         delay the second interlaced video signal by 1 horizontal line delay when the third video signal is generated,
         add the second field of the first interlaced video signal and the first field of the delayed second interlaced video signal, and
         validate a blanking line among the plurality of blanking lines of the first field of the delayed second interlaced video signal,
         wherein the blanking line corresponds to a valid line among the plurality of valid lines of the second field of the first interlaced video signal, and
         wherein the addition is performed in a state in which the blanking line is validated.

2. The video processing apparatus according to claim 1, further comprising:
a first video signal output unit for outputting the third video signal; and
a second video signal output unit for outputting the first and the second interlaced video signals.

3. The video processing apparatus according to claim 2, wherein the third video signal output by the first video signal output unit and the first and the second interlaced video signals output by the second video signal output unit are output at the same time.

4. The video processing apparatus according to claim 1, further comprising:
a video display unit for displaying the third video signal generated by the video addition unit.

5. The video processing apparatus according to claim 1, wherein the first and the second interlaced video signals conform to an HD-SDI (High Definition-Serial Digital Interface) standard.

6. A video processing apparatus comprising:
a video addition unit operable to:
   receive a first interlaced video signal and a second interlaced video signal, wherein each of the first and the second interlaced video signals comprises a first field and a second field, and wherein each field of the first and the second interlaced video signals comprises a plurality of blanking lines and a plurality of valid lines; and
   add the first and the second interlaced video signals to generate a third interlaced video signal,
      wherein to add the first and the second interlaced video signals, the video addition unit is operable to:
         delay the second interlaced video signal by 1 horizontal line delay;
         add the second field of the first interlaced video signal and the first field of the delayed second interlaced video signal, and
         validate a blanking line among the plurality of blanking lines of the first field of the delayed second interlaced video signal,
         wherein the blanking line corresponds to a valid line among the plurality of valid lines of the second field of the first interlaced video signal, and
         wherein the addition is performed in a state in which the blanking line is validated.

7. A video processing method comprising:
in a video addition unit:
   receiving a first interlaced video signal and a second interlaced video signal, wherein each of the first and the second interlaced video signals comprises a first field and a second field, and wherein each field of the first and the second interlaced video signals comprises a plurality of blanking lines and a plurality of valid lines; and
   adding the first and the second interlaced video signals to generate a third interlaced video signal, wherein the third interlaced video signal is ½× of the first interlaced video signal,
      wherein the addition of the first and the second interlaced video signals further comprises:
         delaying the second interlaced video signal by 1 horizontal line delay;
         adding the second field of the first interlaced video signal and the first field of the delayed second interlaced video signal, and
         validating a blanking line among the plurality of blanking lines of the first field of the delayed second interlaced video signal,
         wherein the blanking line corresponds to a valid line among the plurality of valid lines of the second field of the first interlaced video signal, and
         wherein the addition is performed in a state in which the blanking line is validated.

8. A video processing method comprising:
in a video addition unit:

receiving a first interlaced video signal and a second interlaced video signal, wherein each of the first and the second interlaced video signals comprises a first field and a second field, and wherein each field of the first and the second interlaced video signals comprises a plurality of blanking lines and a plurality of valid lines; and adding the first and the second interlaced video signals to generate a third interlaced video signal, wherein the addition of the first and the second interlaced video signals further comprises:

delaying the second interlaced video signal by 1 horizontal line delay;

adding the second field of the first interlaced video signal and the first field of the delayed second interlaced video signal, and validating a blanking line among the plurality of blanking lines of the first field of the delayed second interlaced video signal, wherein the blanking line corresponds to a valid line among the plurality of valid lines of the second field of the first interlaced video signal, and wherein the addition is performed in a state in which the blanking line is validated.

* * * * *